United States Patent Office 2,926,997
Patented Mar. 1, 1960

2,926,997

SYNTHESIS OF CHRYSOTILE

George L. Kalousek, Toledo, Ohio, assignor, by mesne assignments, to Owens-Corning Fiberglas Corporation, a corporation of Delaware No Drawing. Application January 2, 1957
Serial No. 632,012

3 Claims. (Cl. 23—110)

This invention relates to the synthesis of chrysotile and more particularly to a process for the alteration of the antigorite component of serpentine by acid leaching to form the chrystotile component.

Chrysotile fibres are commercially available for use in the preparation of high temperature insulation, such as that used in structural building units, including fire doors, wall panels, and the like. Prior to such use, however, it is necessary to break these chrysotile fibres down into fibres of colloidal dimensions, i.e., fibres having diameters of less than one micron and lengths of approximately three times their diameters. Chrysotile fibre is an expensive product and the reduction thereof to fibres of colloidal dimensions is an additional expense.

Serpentine, a complex hydrous, magnesium silicate ($Mg_3Si_2O_7H_2O$) which occurs in green massive lamellar masses as a constituent of rocks and often contains ferrous oxide, consists of two components, both complex magnesium silicate salts, namely a matrix, commonly called antigorite, and the fibres on the matrix, called chrysotile. Existing theories on the morphology of serpentine do not explain why only very minute amounts of serpentine convert to the fibrous form known as chrysotile.

It has been my theory that chrysotile did not form hydrothermally in serpentine fissures but, rather, was the result of the conversion of the platy antigorite to the fibrous chrysotile form, in situ, due to the matrix being subjected to high mechanical stress in accordance with the Braun-Le Chatelier principle. In order for this transformation to occur, it is necessary that the specific volume of the antigorite matrix be larger than that of the chrysotilye fibres. When the opposite is true, the reaction Chrysotile→Antigorite proceeds to the right. This has been demonstrated by subjecting a serpentine specimen to a compressive stress of approximately 15,000 p.s.i., while increasing the temperature of the specimen from 25 to 500° C. It was apparent that the matrix specimen became more antigorite-like, as shown by X-ray technique developed for differentiation between antigorite and chrysotile. However, up to now, the hydro-thermal synthesis of chrysotile, as found in native form, from antigorite, has appeared extremely remote.

In native habits, antigorite definitely occurs in flat plates, and when these plates are ground to sub-microscopic fineness, the chrysotile still retains the flat platy habit. When the chrysotile is micronized to plates in the order of 30 to 50 angstroms thick, they either curve or completely roll up into capillary-like fibers. The theory which I have evolved is that the stresses between the tetrahedral and octahedral positions in the antigorite layers are such that they tend to be equalized. If an unbalance can be produced in the stresses in these octahedral and tetrahedral layers, curvature or complete rolling up of the thin sheets into tubes will result.

Accordingly, it is an object of this invention to hydrothermally convert the antigorite component of serpentine to chrysotile.

It is a further object of this invention to convert the antigorite component of a comparatively cheap mineral, serpentine, to chrysotile fibres and, during the conversion, to form the chrysotile into colloidal dimensions of less than 1 micron in diameter and of approximately three times the diameters in length.

Still another object is to produce chrysotile fibres by a simple and economic process for use in high temperature insulation material.

In attaining the objects of this invention, one feature resides in creating an unbalance in the stresses in the octahedral and tetrahedral layers of the platy antigorite to cause the layers to roll up completely into tubular fibres.

A further feature resides in leaching the platy antigorite with an acid of known strength to extract particular ions from the tetrahedral and octahedral layers.

Other objects, features and advantages of the invention will become more apparent from a reading of the subsequent disclosure.

From an examination of fibre-matrix components of serpentine specimens, it was noted that the $Al_2O_3$ content and generally the $Fe_2O_3$ and $FeO$ content was always lower in the fibre component. By X-ray technique, it was determined that the intensities of the 7.3/3.6 A. lines and the line at 4.7 A. were related to the iron content in the specimens.

It appears that iron is present in the octahedral position in the structure of the matrix component of serpentine. Present X-ray results on matrix specimens of serpentine before and after acid washing show (by the disappearance of the 4.7 A. line which has been correlated with the iron content) that the iron has been extracted from the lattice without alteration in the structure. Accordingly, if in the matrix specimens the distribution of the $Al_3^+$ and especially the $Fe_3^+$ and $Fe_2^+$ ions, is such between the tetrahedral and octahedral positions that the stresses to produce curvature in the plate tend to be equalized, the extraction of certain ions from the structure would cause an unbalance to be produced between the octahedral and tetrahedral layers and would cause curvature and/or complete rolling up of the thin sheets into capillary-like tubes.

In converting the antigorite to chrysotile, the preferred method embodies two steps. First, the antigorite is treated with an acid, among which is included hydrochloric acid, and the magnesium $Mg(OH)_2$ layer and associated elements, such as $Al_3^+$, $Fe_3^+$ and $Fe_2^+$ are extracted from the antigorite lattice. The amount of extraction is held to a minimum in order to prevent collapse of the structure. Thus complete extraction is never necessary. However the fraction of the total $Mg_2^+$ ions which should be extracted varies from about 5 to 75% of the total, depending upon the amount of the extraneous constituents present in the mineral.

Second, after the antigorite has been leached by acid, the mixture is filtered and the remaining solid is essentially an antigorite structure devoid of from 5 to 75% of the magnesium hydroxide, together with $Al_3^+$, $Fe_3^+$ and $Fe_2^+$ ions. The resulting product is in the shape of curved laths of a fibrous nature in contrast to the rigid plate-like crystals of the antigorite. Furthermore, the chrysotile fibers which are formed have colloidal dimensions of approximately 1 micron or less in diameter and of approximately three times the diameter in length.

While the following is a specific example of one embodiment of the invention, it is not to be considered as limiting the invention in any manner thereto.

Example

A mixture of rigid plate-like crystals of antigorite matrix was leached with hydrochloric acid and the mixture was then filtered and washed with water to remove the remaining acid. The resulting solids were in the shape of curved laths of a fibrous nature having the desired colloidal dimensions of approximately 1 micron or less in diameter and approximately three times the diameter in length.

Magnesium hydroxide can be reintroduced into the chrysotile structure. The partially extracted residue is treated with a mixture of $Mg(OH)_2$ and $MgCl_2$ ranging in compositions from approximately 1% $MgCl_2$ to saturation values corresponding to the solubility of $Mg(OH)Cl$, a product of reaction. The temperature of the mixture may be varied from 5 to 100° C. with the use of higher temperatures being preferred since it accelerates reaction.

Another method of reintroducing the $Mg(OH)_2$ into the skeleton is by suspending the extracted residue in water and $Mg(OH)_2$, with or without addition of $MgCl_2$, and autoclaving the suspension at temperatures of 100 to 375° C. The higher the pressure, the more rapid will be the reaction.

While only one embodiment of this invention has been described, this is merely illustrative and is not to be considered a limitation thereof. It is intended in the appended claims to include all modifications which would be apparent to those skilled in the art and which fall within the scope of the invention.

Having fully described the invention, what I claim is:

1. The method of forming capillary-like fibers of crysotile comprising leaching thin, flat, platy, lattice crystals of antigorite whose octahedral and tetrahedral layers are in balance, said layers containing $Mg(OH)_2$ and $Al_3^+$, $Fe_3^+$ and $Fe_2^+$ ions, with an amount of hydrochloric acid sufficient to remove from 5 to 75% of the total $Mg(OH)_2$, together with a sufficient number of said ions to cause an unbalance in the stresses between said layers, the resulting unbalanced, flat, platy crystals rolling up into capillary-like chrysotile fibers.

2. The method defined in claim 1 wherein the resulting capillary-like chrysotile fibers have a diameter of up to one micron and a length of up to three microns.

3. The method defined in claim 1 wherein said chrysotile fibers are filtered and washed to remove all traces of hydrochloric acid.

References Cited in the file of this patent
UNITED STATES PATENTS

| | | |
|---|---|---|
| 2,593,125 | Eaton et al. | Apr. 15, 1952 |
| 2,616,801 | Badollet | Nov. 4, 1952 |
| 2,661,288 | Barbaras | Dec. 1, 1953 |

OTHER REFERENCES

Mellor: "Comprehensive Treatise on Inorganic and Theoretical Chemistry," vol. 6, part 2, page 425, 2nd paragraph, lines 18 to 23.